United States Patent [19]

Yoshikawa

[11] Patent Number: 4,858,219
[45] Date of Patent: Aug. 15, 1989

[54] OPTICAL INFORMATION RECORDING REPRODUCING MEMORY SYSTEM WITH BOTH POWER CONTROL AND OPTICAL IRRADIATION INHIBITING CIRCUIT

[75] Inventor: Shozi Yoshikawa, Hachioji, Japan

[73] Assignee: Olympus Optical Company Limited, Japan

[21] Appl. No.: 169,106

[22] Filed: Mar. 9, 1988

Related U.S. Application Data

[63] Continuation of Ser. No. 799,902, Nov. 20, 1985, abandoned.

[30] Foreign Application Priority Data

Nov. 20, 1984 [JP] Japan .................................. 59-245483
Nov. 21, 1984 [JP] Japan .................................. 59-246902

[51] Int. Cl.$^4$ .......................... G11B 13/00; G11B 7/00
[52] U.S. Cl. ...................................... 369/116; 369/44; 369/54
[58] Field of Search ......................... 369/54, 106, 122; 372/29, 44–46, 106; 250/205

[56] References Cited

U.S. PATENT DOCUMENTS

| 4,221,960 | 9/1980 | Maeda et al. | 369/116 X |
| 4,334,301 | 6/1982 | Kanamaru | 369/116 |
| 4,426,693 | 1/1984 | Satoh et al. | 369/116 X |
| 4,488,277 | 12/1984 | McFarlane et al. | 369/116 X |
| 4,507,767 | 3/1985 | Takasugi | 369/116 X |
| 4,509,156 | 4/1985 | Ohara et al. | 369/116 X |
| 4,516,241 | 5/1985 | Yokota | 369/116 X |
| 4,554,652 | 11/1985 | Maeda et al. | 369/44 |
| 4,566,088 | 1/1986 | Yoshida et al. | 369/116 X |
| 4,692,606 | 9/1987 | Sakai et al. | 250/205 |
| 4,700,057 | 10/1987 | Sakai | 250/205 |
| 4,701,609 | 10/1987 | Koishi et al. | 369/116 X |
| 4,734,914 | 3/1988 | Yoshikawa | 250/205 X |
| 4,742,505 | 5/1988 | Takeuchi et al. | 369/116 X |

FOREIGN PATENT DOCUMENTS

| 53-89384 | 5/1978 | Japan | 372/29 |
| 55-107284 | 8/1980 | Japan | 372/29 |
| 122240 | 9/1980 | Japan | 369/106 |
| 56-104486 | 8/1981 | Japan | 372/29 |

OTHER PUBLICATIONS

"Lightwave Sources & Detectors"; Sponsler; Solid State Technology, Mar. 81, pp. 93–101-369/122.

Primary Examiner—Aristotelis M. Psitos
Attorney, Agent, or Firm—Bruce L. Adams; Van C. Wilks

[57] ABSTRACT

There is provided an optical information recording and reproducing system which comprises a light source, a light beam power compensation circuit which can compensate a fluctuation of an emitted light beam power from the light source in response to a detected monitor signal corresponding to a light flux from the light source, a light beam control circuit composed of at least one control loop which controls the light beam emitted from the light source and irradiates the same onto a data storing medium, and a light beam inhibit circuit which can inhibit irradiation of the light beam onto the data storing medium.

16 Claims, 10 Drawing Sheets

OPTICAL INFORMATION RECORDING REPRODUCING MEMORY SYSTEM WITH BOTH POWER CONTROL AND OPTICAL IRRADIATION INHIBITING CIRCUIT

This is a Rule 62 continuation application of parent application Ser. No. 799,902 filed Nov. 20, 1985 now abandoned.

BACKGROUND OF THE INVENTION

1. Field of the Invention

The present invention relates generally to an optical information recording and reproducing memory system which records, reproduces or erases information data by means of an irradiation of a light beam onto a data storing medium.

More specifically, the present invention relates to an automatic light power compensation system for the above described optical memory system whereby the emitted power of a light beam from a light source is automatically compensated for the fluctuation from a suitable level, and a stable light beam can be maintained.

2. Description of the Prior Art

In an optical information recording and reproducing memory system, information data is recorded, reproduced or erased by means of a light beam which is irradiated onto a data storing medium such as an optical disk.

In general, a data storing medium of this kind, e.g. thermoplastics or magneto-optical magnetic film, shows a non-linear light sensitive characteristic.

On the other hand, a laser diode or other kind of laser oscillator is generally used for the light source in the above described optical memory system. However, these kinds of light sources have their own temperature characteristics of oscillating laser power. Furthermore, there is a degradation of the laser power because of the degradation of the laser source itself.

Under the above mentioned conditions, an automatic light power compensation system is widely used for the optical memory system, whereby a laser power from the light source is automatically compensated for the power fluctuation and stable information recording, reproducing or erasing can be performed.

For example, as disclosed in U.S. Pat. No. 4,692,606 to Sakai and Yoshikawa, a light flux or beam from a laser diode as a light source as detected by a p-i-n photo diode whereby the light power level or light beam intensity of the light source is converted to a power monitor signal. A window type comparator with the upper and lower threshold reference levels is supplied with the power monitor signal and produces a compared output signal. The comparater provides a down-count signal to an UP-DOWN counter when the power monitor signal exceeds the upper threshold reference level, and the comparator provides an up-count signal to the UP-DOWN counter when the power monitor signal is less than the lower threshold reference level. Thereafter, the digital output signal of the UP-DOWN counter is converted to the analog signal by means of a D/A converter. Therefore, the power level of the laser beam from the laser diode is controlled by the analog signal so that the laser power is compensated for the fluctuation from the suitable power level. In other words, a laser power compensation is performed by means of the closed servo control system in which the power monitor signal controls the laser drive current automatically.

Namely, the laser power compensation in the prior art system is performed by the closed servo loop wherein, at first, the light source has to emit the light beam, and then a part of the light beam is detected and the drive signal for the light source is controlled so that the desired stable output light power can be maintained from the light source.

According to the prior art system, only when the light power level remains within a controllable range can a stable control of the light power level depending on the power fluctuation be performed.

However, when the light power level is out of the controllable range, the light power compensation system in the prior system art can not follow the rapid fluctuation in the light power level, and the power compensation system can not work till the power monitor signal enables the closed servo loop.

Furthermore, when a data storing medium is mounted on the memory system, and due to the fact that the compensation system controls the light output only within the controllable range, an uncontrolled light beam may irradiate the data storing medium.

In any case, according to the prior art system, a defective information recording or a burst in the data storing medium may be caused in the optical memory system because of lack of reliability in the power compensation system.

SYSTEM OF THE INVENTION

It is a general object of the present invention to obviate the above described drawbacks and to provide an improved automatic light power compensation system for the optical information recording and reproducing memory system.

It is a more specific object of the present invention to provide an improved automatic light power compensation system whereby a light power is compensated in response to a fluctuation of a light source.

It is another object of the present invention to provide an improved optical information recording and reproducing memory system in which neither unnecessary signal recording nor burst is made on a data storing medium while a light power control is adjusted to the memory system even if the data storing medium is mounted on the system.

According to the present invention, there is provided an optical information recording and reproducing system which comprises a light source, light beam power compensation circuit which can compensate a fluctuation of an emitted light power from the light source according to a detected monitor signal corresponding to a light flux power level of a from the light source, a light beam control circuit comprised of at least one control loop which controls the light flux beam which is emitted from the light source and irradiates a data storing medium, and a light beam inhibit circuit which can inhibit an irradiation of the light beam onto the data storing medium. Furthermore, according to the present invention, there is provided an automatic light power compensation system which comprises, a comparator which produces a compared output of a detected monitor signal of a light flux from a light source by comparing the detected monitor signal to a reference signal, a digital adjusting circuit which is supplied with the compared output and produces an analog adjusting signal via digital signal processing. PID circuit which is supplied with the compared output, and a subtractor circuit which is supplied with said analog adjusting signal and an output signal from the PID circuit.

BRIEF DESCRIPTION OF THE DRAWINGS

The invention will be described in more detail in conjunction with the drawings, in which.

DESCRIPTION OF THE PREFERRED EMBODIMENTS

Figure 1:
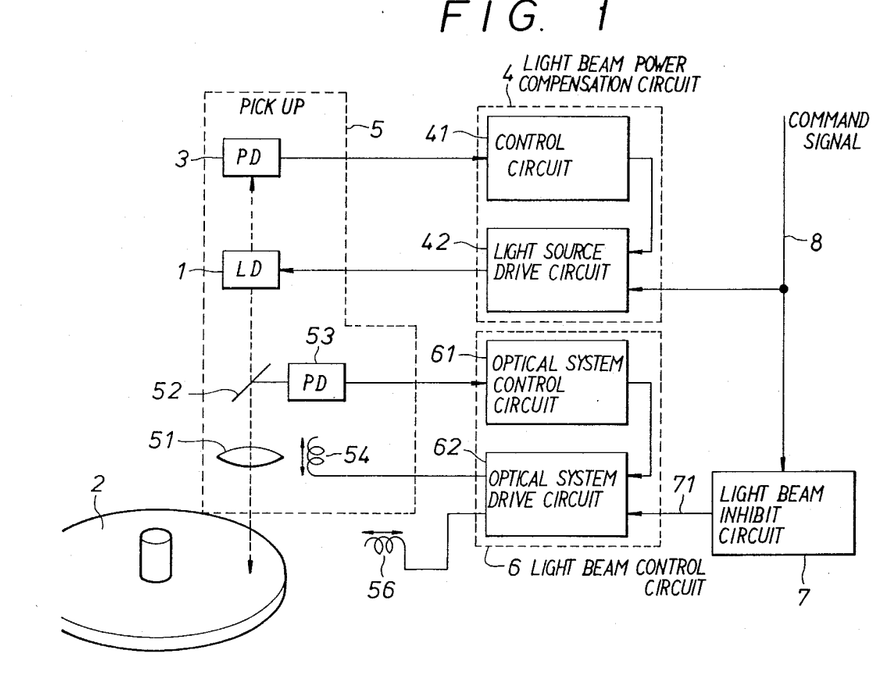
FIG. 1 is a block diagram showing an optical information recording and reproducing system according to the present invention.
Figure 2:
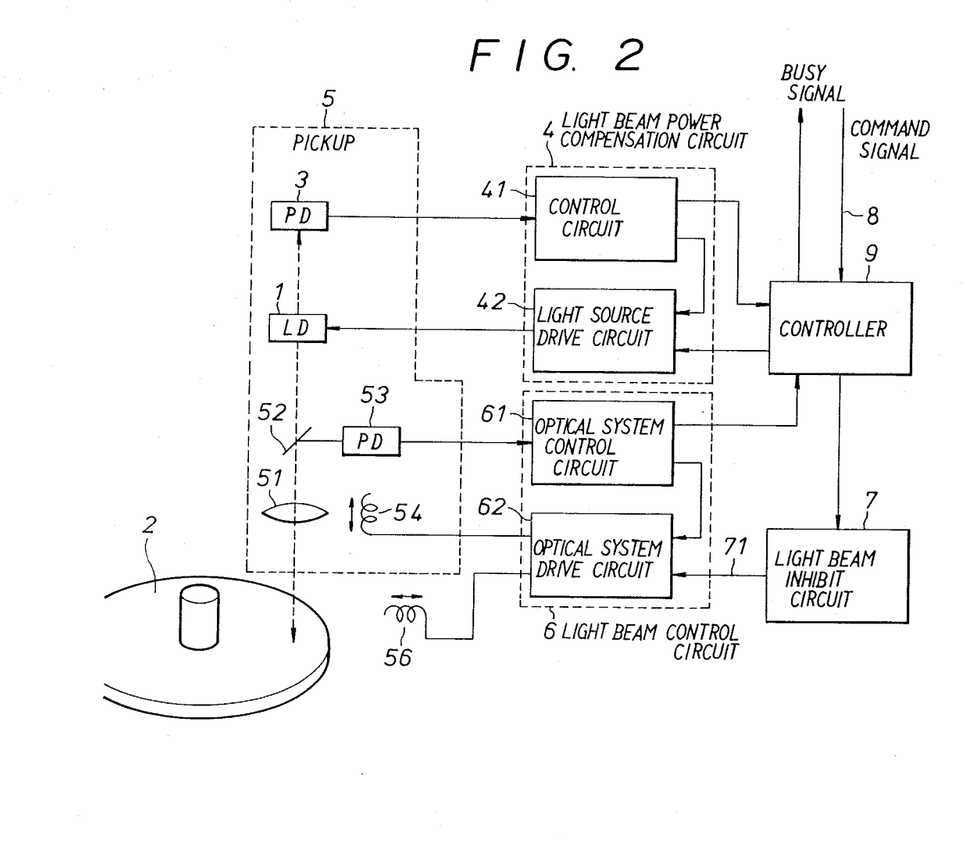
FIG. 2 is another block diagram showing an optical information recording and reproducing system according to the present invention.
Figure 3:
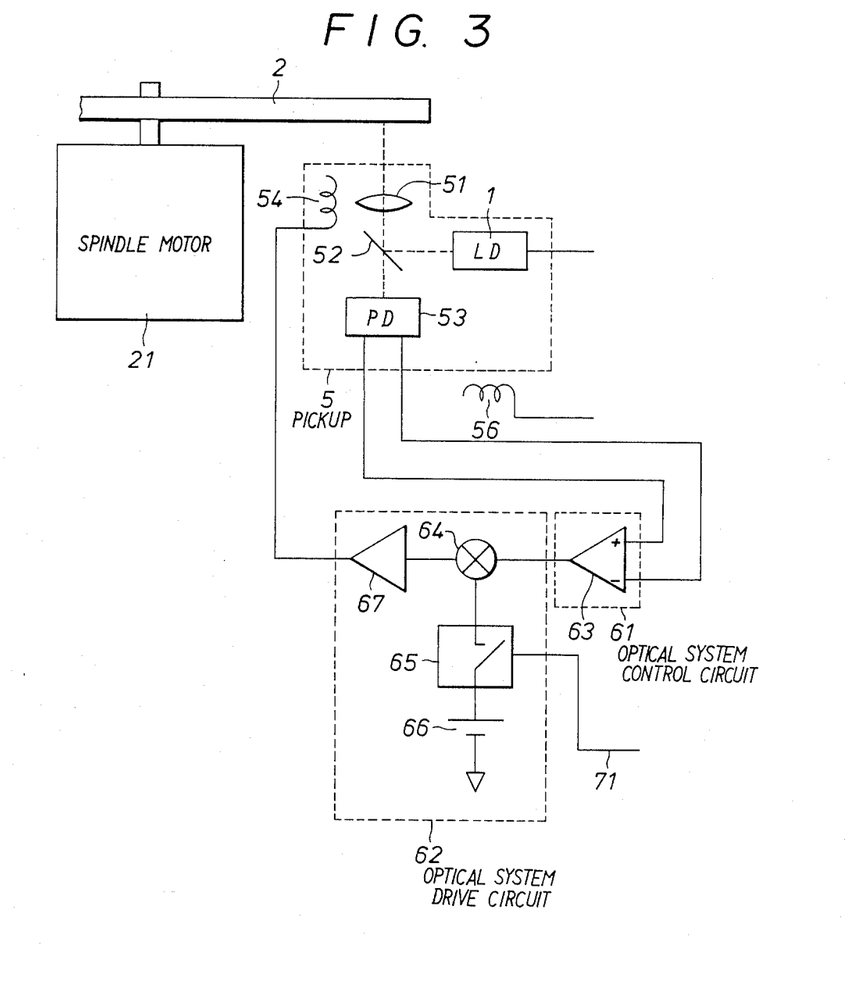
FIG. 3 is a further block diagram showing an optical information recording and reproducing system according to the present invention.

Referring now to FIG. 1 to FIG. 3 of the drawings, the preferred embodiments of an optical information recording and reproducing system according to the invention will be described.

In the following description referring to the drawings, the same reference numerals will be used in the several illustrations to represent the same elements.

A laser beam from a laser diode 1 irradiates a data storing medium 2. A light flux emitted from the rear-end of the laser diode 1 is partially detected by a photo detector 3 e.g. p-i-n photo diode. An automatic light beam power compensation circuit 4 comprised of a control circuit 41 and a light source drive circuit 42 is supplied with detected monitor signal from the p-i-n photo diode 3. The power or intensity level of the light flux beam emitted from the light source 1 is controlled to maintain stable light output by means of a drive current which is produced by the drive circuit 42. An optical pickup 5 comprised of a moving objective lens 51 which controls the focusing or the tracking of the light beam directs the light flux beam from the laser diode 1 to an appropriate position of the data storing medium 2. A reflected light from the data storing medium 2 is detected by a photo detector 53 via the lens 51 and a half mirror 52 installed in the pickup 5. The photo detector 53 is a dual- or quadruple-photo detector. A light beam control circuit 6, comprised of an optical system control circuit 61 and an optical system drive circuit 62 is supplied with a detected signal from the photo detector 53. The optical system drive circuit 62 supplied with a detected and processed focus error signal or a tracking error signal drives the moving lens 51 through a coil 54 or by means of a voice coil motor (VCM) 56 so that the light beam focusing control or tracking control is performed. The VCM 56 moves the pickup 5, for example, towards the radial direction of the data storing medium 2 if the medium is disk shape. A light beam inhibit circuit 7 supplied with a command signal 8 provides an inhibit signal 71 to the optical system drive circuit 62 of the light beam control circuit 6. Furthermore, the light source drive circuit 42 in the automatic light beam power compensation circuit 4 is also supplied with the command signal 8.

According to the embodiment above described, in advance of the information recording or reproducing of the data storing medium 2, in response to the supplied command signal 8, the light beam inhibit circuit 7 of the system controls to defocus the light flux beam or shift the beam out of the recording area of the data storing medium 2 to inhibit effective irradiation of the light beam onto the data storing medium 2 by means of the coil 54 which is supplied with the drive current from the drive circuit 62 to defocus the light beam from the laser diode 1 or by means of VCM 5 which is supplied with the shifting drive current from the drive circuit 62. Thereafter, the light source drive circuit 42 is supplied with the command signal 8 and the laser diode 1 emits the light flux beam with a power sufficient to record or erase the data onto the data storing medium. The photo detector 3 which detects the part of the light flux from the rear-end of the laser diode 1 produces the light power monitor signal and the automatic power compensation of the light beam from the laser diode 1 can be performed by means of the automatic light beam power compensation circuit 4 which comprises the control circuit 41 and the light source drive current 42.

FIG. 2 is another block diagram showing another embodiment of the invention. A controller 9 which is supplied with a command signal 8 from a CPU (not shown) provides the output signal to a light source drive circuit 42 in a light beam power compensation circuit 4 and to a light beam inhibit circuit 7. An optical system drive circuit 62 is supplied with the output signal 71 from the light beam inhibit circuit 7. A control circuit 41 in the light beam power compensation circuit 4 provides a range deviation signal to the controller 9. Furthermore an optical system control circuit 61 in the light beam control circuit 6 provides a light beam inhibit completion signal to the controller 9.

According to the above described embodiment, upon receiving the command signal 8, the light beam inhibit circuit 7 is supplied with the output signal from the controller 9. Then a coil 54 for the moving lens 51 and VCM 56 is driven by the optical system drive circuit 62 so that the lens 51 defocuses the light beam or shifts the beam out of the recording area of the data storing medium 2.

On the other hand, a reflected light from the data storing medium 2 is detected by a photo detector 53 and the optical system control circuit 61 is supplied with the detected signal from the photo detector 53. The optical system control circuit 61 supplies the controller 9 with the light beam inhibit completion signal which informs the completion of the shift or the defocusing of the light beam, Thereafter, the light source drive circuit 42 is supplied with the output signal from the controller 9 and starts to control the light beam compensation by means of the control circuit 41. Furthermore, when the detected signal from the photo detector 3 is out of the range between upper or lower threshold levels which are previously set in the control circuit 41, the control circuit 41 supplies the range deviation signal to the controller 9. Then the controller 9 produces a busy signal whereby the recording or erasing operation could be stopped.

FIG. 3 is a further block diagram showing embodiment of the invention. An output signal from a dual- or quadruple-photo detector 53 is supplied to a differential amplifier 63 of an optical system control circuit 61. The differential amplifier 63 supplies a focus error signal to an adder 64 in an optical system drive circuit 62. On the other hand, the adder 64 is connected to a power source 66 via switch means 65. The power source 66 supplies a drive current for defocusing the light beam to a coil 54. The switch means 65 is supplied with the inhibit signal 71 from the light beam inhibit circuit (shown 7 in FIG. 2), whereby the switch opens or closes the circuit. The adder 64 supplies a driver amplifier 67 with the added output signal, and the output signal from the driver amplifier 67 is provided to the coil 54 in an optical pickup 5. A spindle motor 21 rotates the data storing medium 2 if the medium is disk shaped.

According to the above described configuration, in advance to the information recording or erasing onto the data storing medium, the switch means 65 connects the adder 64 to the power source 66 depending on the inhibit signal 71 from the light beam inhibit circuit. Then the adder 64 supplies the drive amplifier 67 with the added signal composed of the signal from the power source and the output signal from the differential amplifier 63. Therefore, the coil 54 can shift the lens 51 so that the light beam is defocused the data storing medium 2.

In the above description of the embodiment, the light beam inhibition is described by the light beam defocusing as a instance. However, any other inhibiting means, for example, means of tracking control system, can be also employed. Namely, the light beam shifting from the recording area of the data storing medium 2 can be also employed by means of the VCM 56.

Figure 4:
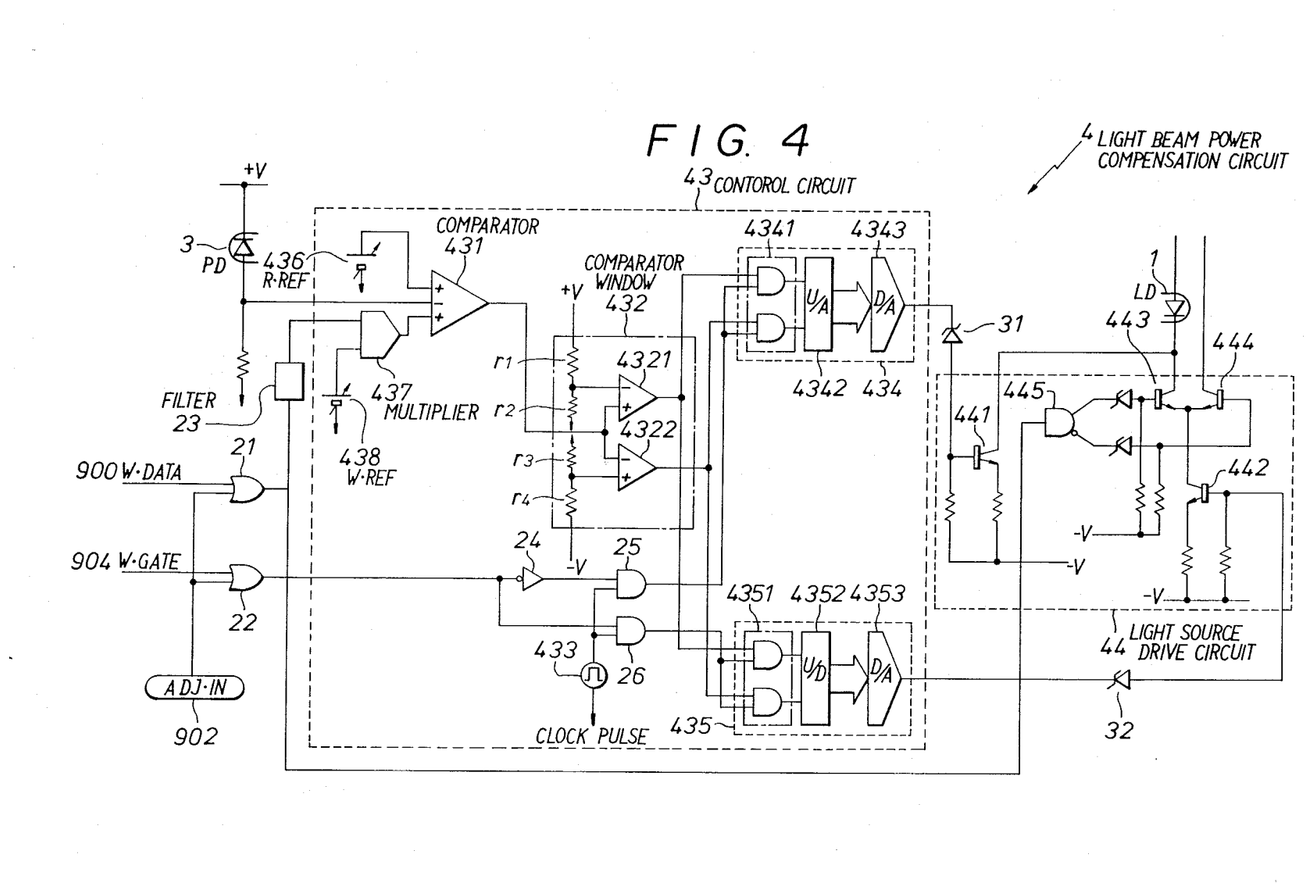
FIG. 4. is a circuit diagram showing an automatic light power compensation system according to the present invention.

FIG. 4 is a circuit diagram showing an automatic light power compensation system of the embodiment. A photo diode 3 in an optical pickup detects a part of the light flux from a laser diode 1, and supplies a control circuit 43 in the light beam power compensation circuit 4 with the detected monitor signal. The control circuit 43 is supplied with a write data signal (W.DATA) 900 and an adjust-in signal (ADJ.IN) 902 via OR gate 21 and a filter circuit 23, and also the circuit 43 is supplied with a write gate signal (W.GATE) 904 and the adjust-in signal (ADJ.IN) 902 via OR gate 22. A light source drive circuit 44 is supplied with the output signal from the control circuit 43 and an OR operated signal of W.DATA signal 900 and ADJ.IN signal 904 by means of OR gate 21. The output signal (drive current) of the light source drive circuit 44 drives a laser diode 1. The control circuit 43 comprises a comparator (i.e. summing amplifier) 431 which is supplied with the output signal of the photo diode 3, a window comparator 432 which is supplied with the output signal from the comparator 431, and analog control circuits 434, 435 which are supplied with the output signal from the window comparator 432 and a clock signal from a clock pulse generator 433. The analog control circuits 434, 435 produce analog control signals which control the output drive current from the light source drive circuit 44 depending on the read mode (information reproducing) or the write mode (recording) of the operation. The comparator 431 is supplied with a reference signal for the read mode (R.REF) from a read reference signal generator 436 and a reference signal for the write mode (W.REF) from a write reference signal generator 438 via a multiplier 437. The multi-plier 437 is also supplied with the output signal from the OR gate 21 via a filter circuit 23. The comparators 4321, 4322 which constitute the window comparator 432, are supplied with the upper and lower reference voltages ($+Vr$, $-Vr$) via resistors r1, r2 and r3, r4 respectively. The output signal from the window comparator 432 is provided to the AND gates 4341, 4351 which constitute the analog control circuits 434, 435 respectively. The output signal from the OR gate 22, which is supplied with W.GATE signal 904 and ADJ.IN signal 902, is provided to an AND gate 26 directly and to AND gate 25 via an inverter 24. AND gate 25 and AND gate 26 are supplied with the clock pulse which is generated by the generator 433. AND gate circuit 4351 in the analog control circuit 435 for generating a higher power light beam is supplied with the output signal from AND gate 25. The output signal from the AND gate circuit 4341 in the analog control circuit 434 for generating a lower power light beam is provided to a D/A converter 4343 via UP-DOWN counter 4342.

The analog-converted output signal from the D/A converter 4343 is provided to a driver transistor 441 for the lower power light beam emission via a zener diode 31. The other analog-converted output signal from the D/A converter 4353 is provided to a driver transistor 442 for the higher power light beam emission via a zener diode 32. A light source drive circuit 44 is, as shown in FIG. 4, comprised of a driver circuit for the lower power light beam which is composed of the n-p-n transistor 441 for low power drive and the peripheral resistors, and a driver circuit for the higher powered light beam which is composed of the n-p-n transistor 442 for high power drive, transistor 443, 444 with the peripheral resistors and gate circuit 445. The gate circuit 445 is supplied with the output signal from the OR gate 21 which is supplied with W.DATA signal 900 and ADJ.IN signal 904.

According to the embodiment described above, the detected monitor signal corresponding to the light flux from the laser diode 1 by means of the photo detector 3 is provided to the comparator 431 in the control circuit 43, and the monitor signal is compared with the reference signal which is provided by the read reference signal generator 436 when the lower power light beam is compensated for the fluctuation from the suitable power level of the information reproducing. The window conparator 432 compares the output signal from the comparator 431 with the upper and lower reference threshold levels and supplies the analog control circuit 434 with the referred output when the output signal from the comparator 431 is out of the range defined by the threshold levels. The analog control circuit 434 is enabled by W.GATE signal 904 via AND gate 25, and counts-up or countsdown the UP-DOWN counter 4342 in response to the supplied clock pulse from the generator 433 and according to the output signal from the window comparator 432. The counter output signal is converted to the analog signal via the D/A converter 4343 and the analog signal is provided to the base terminal of the transistor 441 in the light source drive circuit 44. Thus the emitted low power laser beam is compensated with respect to the power level for the fluctuation from the suitable power level.

In the similar manner as previously described, when the higher power light beam is compensated for the fluctuation from the suitable power level of the information recording or erasing, the comparator 431 is supplied with the detected monitor signal from the photo detector 3 and the multiplied signal of the write reference signal from the write reference signal generator 438 and the filtered output signal from the filter circuit 23 which is supplied with OR gated W.DATA 900 and ADJ.IN 902. The filter 23 operates to smooth the W.DATA signal and produces the meaned level signal. So, if the frequency response of the multiplier 437 is high enough, the filter 23 is not necessary for the write reference circuit. The comparator 431 is supplied with multiplied reference signal by means of the multiplier 437, because the comparator 431 should be supplied with the product of a mark rate of the modulated signal and W.REF 438, which is, in other words, the meaned high level reference signal for the radiated high power when W.DATA signal 900 or ADJ.IN signal 902 is supplied to the light power compensation system. The window comparator 432 compares the output signal from the comparator 431 with the upper and lower reference threshold levels and supplies the analog control circuit 435 which the output signal when the output signal from the comparator 431 is out of the range defined by the threshold levels. The analog control circuit 435 is enabled by W.GATE signal 904 via AND gate 26, and countsup or countsdown the UP-DOWN counter 4352 in response to the clock pulse which is applied from the generator 433 and according to the output signal from the window comparator 432. The counter output is converted from the digital signal to the analog signal by means of the D/A converter 4353 and the analog signal is provided to the base terminal of the transistor 442 of the light source drive circuit 44. On the other hand, W.DATA signal 900 is provided to the transistors 443, 444 via the gate circuit 445, and the laser diode 1 is driven in pulsive mode by means of ON and OFF switch of the transistors 443, 444 depending on the W.DATA signal 900. Though the drive current of the laser diode 1 is controlled by means of the collector current of the transistor 442, the light beam power compensation of the laser diode is performed.

In case of the higher power light beam compensation by means of ADJ.IN a signal 902, the filter circuit 23 is supplied with ADJ.IN signal via OR gate 21, and the reference signal for the comparator 431 is provided by the multiplier 437 by multiplying the filter output and the write reference signal produced from the signal generator 438. On the other hand, AND gate 26 is supplied with ADJ.IN signal 902 via OR gate 22 and the clock pulse, and the gate 26 supplies the analog control circuit 435 with the output. Therefore, the higher power light beam compensation is performed in the same manner as the power compensation case of the information recoding or erasing mode which is previously described.

In the above described embodiment, UP-DOWN counters which are provided in the analog control circuits 434, 435 effects compensation.

Furthermore, in case of ADJ.IN operation according to the embodiment, the inhibit operation which is described previously can be also applied.

Figure 5:
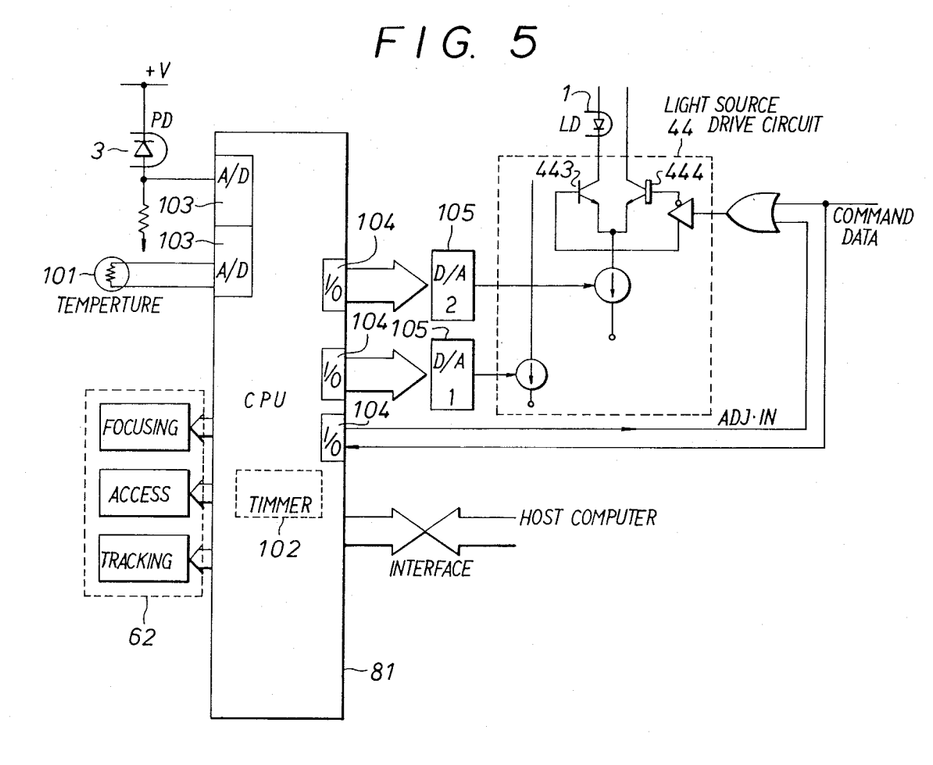
FIG. 5 is another block diagram showing an automatic light power compensation system according to the present invention.

FIG. 5 is another block diagram showing another automatic light power compensation system according to the present invention. According to the embodiment, the control circuit 41, the optical system control circuit 61, the light beam inhibit circuit 7 and the controller 9 which are shown in FIG. 2 are built in a single CPU 81. Furthermore, CPU 81 is supplied with the temperature signal from the temperature sensing device 101 which detects ambient temperature or device temperature of the laser diode 1. Also, CPU 81 includes a timer circuit 102 internally and measures the running time of the system. In FIG. 5, the same reference numerals in FIG. 2 is used to represent the same elements.

According to the embodiment, A/D converters 103 which are provided in CPU 81 are supplied with the analog input signals such as the output signal from the photo detector 3 or the temperature signal from the sensor 101, and the converted digital signals are processed in CPU 81. The light source drive circuit 44 is supplied with the output signals from CPU 81 via I/O interfaces 104 and D/A converters 105.

Figure 6A:
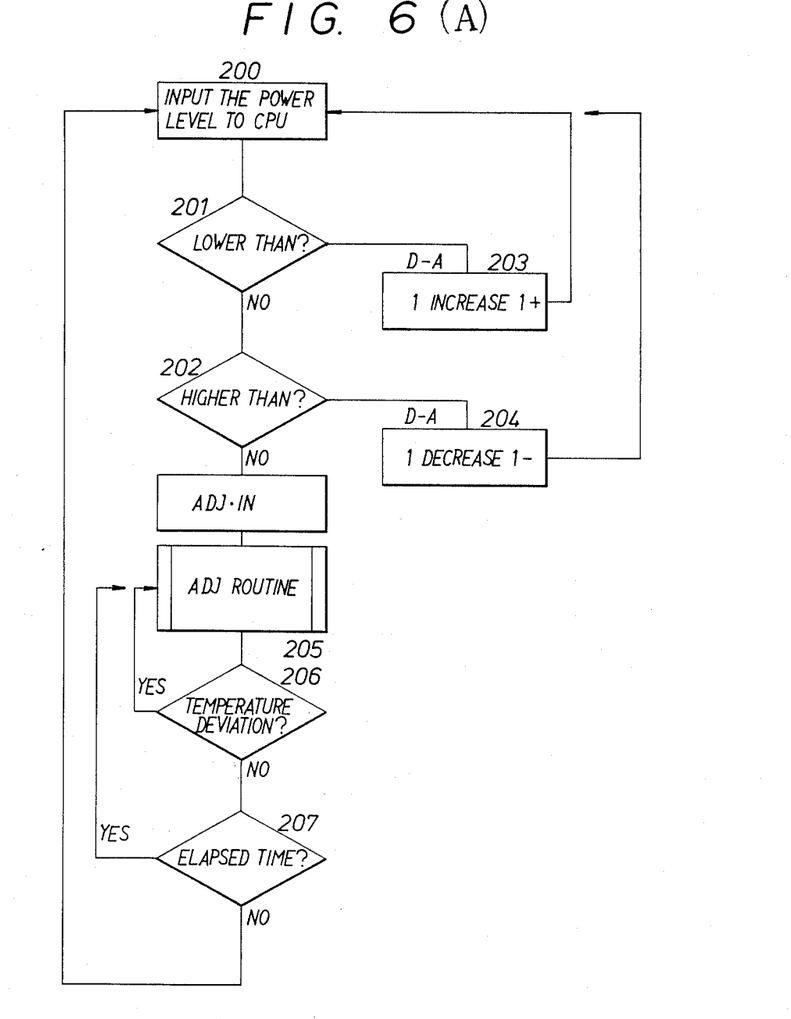
FIGS. 6(A),(B) are the flow charts for explaining the operation of the present invention shown in FIG. 5.
Figure 6B:
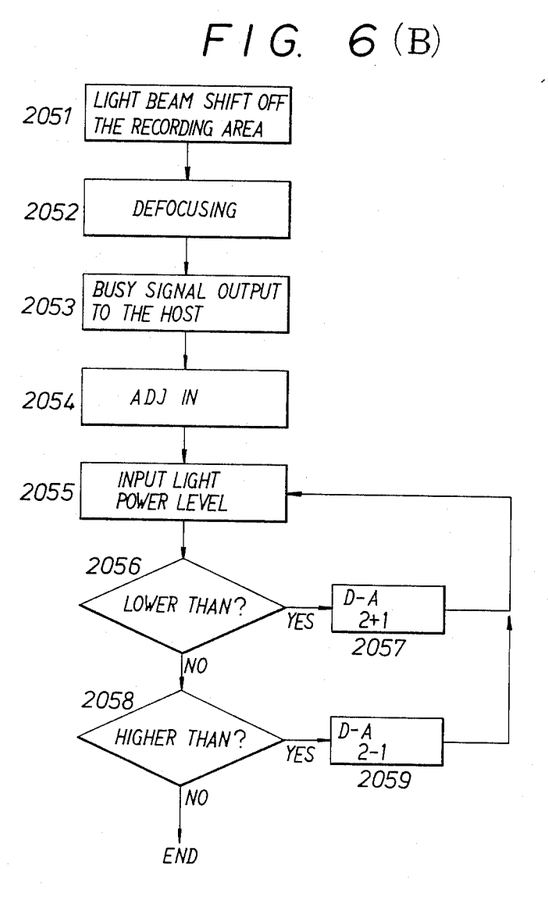

FIGS. 6(A),(B) are the flow charts for explaining the operation of the embodiment shown in FIG. 5. FIG. 6(A) shows the process flow of the low power compensation in the reproducing mode and transfer to the high power compensation in the recording mode. In the period of reproducing mode, the emitted light power level from the light source is provided to the controller 8 (200 in FIG. 6(A)). Then the level is compared with the upper and lower threshold references (201, 202) in looped operation (203, 204) and the power level from the light source is automatically controlled in the reproducing period.

When the ADJ.IN signal is produced (in case of start time, the ADJ.IN or command signal is automatically produced in the CPU), the moving lens 51 (shown in FIG. 2) is shifted to change the position by the ADJ routine (205) and the light beam is shifted away from the recording area of the data storing medium and/or the light beam is defocused. Thereafter, the higher power light beam compensation for the recording mode is performed. Furthermore, the light power compensation for the recording mode is performed depending on the temperature signal (206), or depending on the running time (207).

FIG. 6(B) shows the more detailed flow chart of the ADJ routine above described. The light beam is at first shifted away from the recording area of the data storing medium (2051) and the beam is defocused by means of the moving objective lens (2052). The ADJ operation is started (2054). After inputting the light power level (2055), the power compensation system compares the input power level with the upper and lower threshold references (2056, 2058) in looped operation (2057, 2059), and the higher power light beam power compensation for the recording mode is performed.

According to the embodiment, when the optical information recording and reproducing system is started (i.e. powered ON), and the ADJ routine of the invention is started, and the optimum light beam power level which is supposed to be best suited for the recording operation is previously memorized in the memory means (i.e. UP-DOWN counter), then light power emitted from the laser diode is compensated.

Further, in the usual information recording period, the light power compensation is performed by means of conventional closed looped control system depending on the detected monitor signal from the photo diode which detects a part of the light flux from the laser diode.

Figure 7:
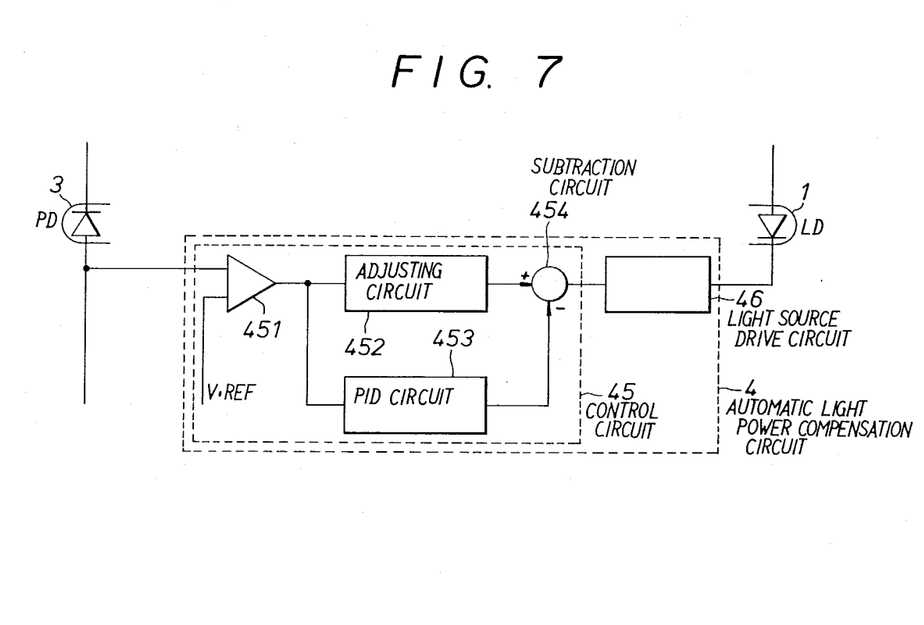
FIG. 7 is still another block diagram showing an automatic light power compensation system according to the present invention.

FIG. 7 is still another block diagram showing an automatic light compensation system according the the embodiment.

A part of the light flux from a laser diode 1, namely the light flux from the rear-end of the laser diode, is detected by a photo diode 3. A comparator 451 of the control circuit 45 in the automatic light power compensation circuit 4 is supplied with the detected monitor signal from the photo diode 3. The comparator 451 is also supplied with a reference voltage V.REF and provides the compared output signal to both an adjusting circuit 452 and a PID circuit 453. A subtraction circuit 454 is supplied with both the adjusting signal which is the output signal of the adjusting circuit 452 and the PID signal which is the output signal of the PID circuit 453, and the circuit 454 produces the subtracted signal of the adjusting signal and the PID signal for a light source drive circuit 46. Thus, the light source drive circuit 46 can compensate the output light power from the laser diode 1.

Figure 8:
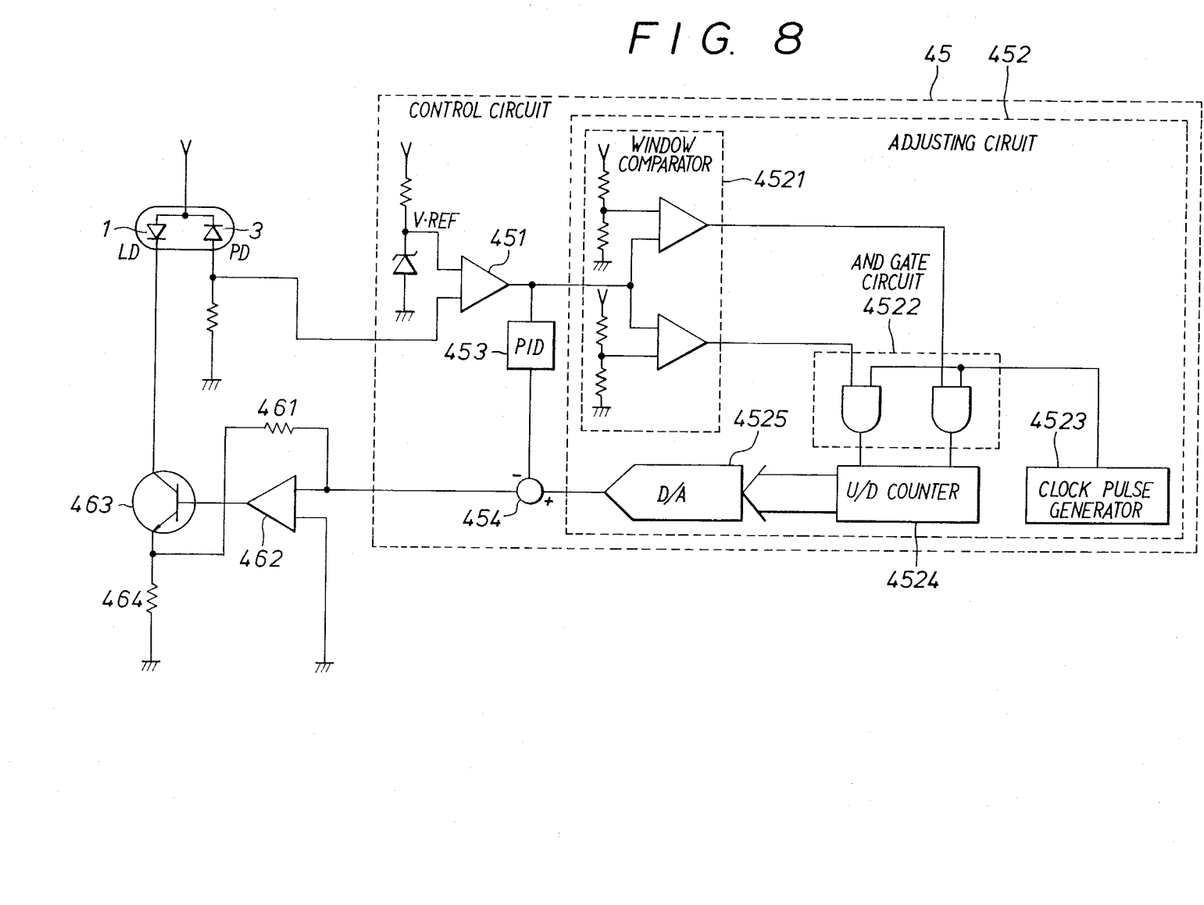
FIG. 8 is a further circuit diagram showing an automatic light power compensation system according to the present invention.

FIG. 8 is a further circuit diagram showing an automatic light power compensation system according to the present invention. In FIG. 8, the same reference numerals to those of FIG. 7 is used to identify the same elements. In the embodiment, an adjusting circuit 452 is comprised of a window comparator 4521, an AND gate circuit 4522, a clock pulse generator 4523, UP-DOWN counter 4524 and a D/A converter 4525.

The compared output signal from the comparator 451 is provided to the window comparator 4521 and compared with the previously set upper and lower threshold reference levels.

The output signals from two comparators which constitute the window comparator 4521 are provided to the AND gate circuit 4522 with the clock signal from the generator 4523 and processed. The output signals from the AND gate circuit 4522 are provided to the UP input and DOWN input of the UP-DOWN counter 4524 whereby up-counts or down counts is performed in response to the clock signal. The digital output of the counter 4524 is converted into an analog signal by means of a D/A converter 4525. A subtraction circuit 454 is supplied with both the analog signal from the D/A converter 4525 and a PID signal from a PID or proportional integral and derivative circuit 453. An operational amplifier 462 is supplied with the subtract output signal and a transistor 463 is driven by the amplified signal from the amplifier 462. A resistor 461 works as the feed back resistor of the amplifier 462 and a resistor 464 works as the current limiter for the transistor 463. Thus the laser diode 1 receives the drive current depending on the subtract signal i.e. (adjusting signal)- (PID signal). Thus the light power compensation of the emitted laser beam from the laser diode 1 is performed.

Figure 9:
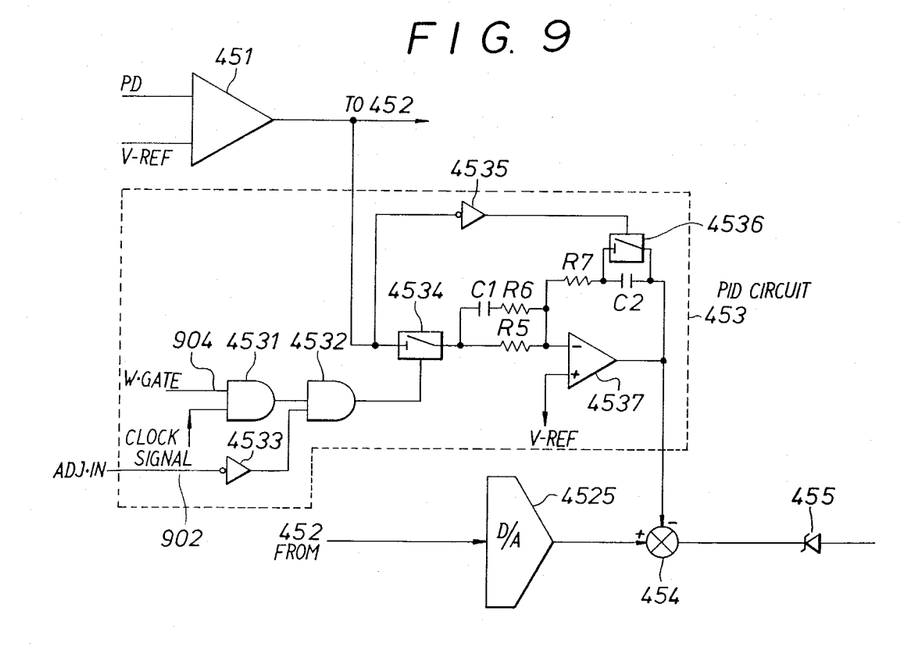
FIG. 9 is a still further circuit diagram showing an automatic light power compensation system according to the invention.

FIG. 9 is a still further circuit diagram showing an automatic light power compensation system according to the invention. An AND gate 4531 of a PID circuit 453 is supplied with both W.GATE signal 904 and a clock signal (instead of a clock signal, W.DATA signal can be used), and the output signal from the gate 4531 is provided to another AND gate 4532 together with th inverted ADJ.IN signal via an inverter 4533. The output signal of the AND gate 4532 is provided to both an analog switch 4534 directly and an analog switch 4536 via an inverter 4535. The resistors R5, R6 and a capacitor C1 provided in the PID circuit 453 constitute a differential circuit with an operational amplifier 4537. A comparator 451 provides the compared output signal to the operational amplifier 4537 via switch 4534 and the differential circuit. On the other hand, a resister R7 and a capacitor C2 constitute an integration circuit with the operational amplifier 4537. The switch 4536 is connected to the capacitor C2 in parallel. The output signal from the operational amplifier 4537 is provided to a subtraction circuit 454 with the analog output from the D/A converter 4525 of the adjusting circuit. The subtracted signal is provided to the light source drive circuit (not shown) via a zener diode 455.

According to the embodiment, the compared output signal of the comparator 451 is provided to both the adjusting circuit 452 and PID circuit 453. The digital adjusting signal from the adjusting circuit 452 is also provided to the subtracting circuit 454 via D/A converter 4525. When the system is operated in the reproducing mode (i.e. both W.Gate signal and ADJ.IN signal keeps low level), the compared output from the comparator 451 is not provided to the differential circuit composed of the capacitor C1 and the resistors R5, R6 because the switch 4534 is kept OFF. Therefore the power compensation is performed by means of the conventional adjusting circuit 452. On the other hand, when the system is operated in the recording mode (i.e. W.GATE signal high level, and ADJ.IN signal keeps low level), the switches 4534, 4536 are supplied with the clock signal (or W.DATA signal) via AND gates 4531, 4532 or via AND gates 4531, 4532 and the inverter 4533. Therefore, the switch 4534 applies the compared output to the PID circuit 453 depending on the clock signal. Furthermore, when ADJ.IN signal keeps high level, the switch 4534 opens the circuit and PID control is not performed. Moreover, the switch 4536 is supplied with the inverted W.GATE signal and the clock signal via the inverter 4535, and the integration control of the PID circuit 453 is properly selected.

According to the embodiment, the light power compensation is performed by means of both the conventional closed loop control system and the PID control system. Therefore the automatic light power compensation with real time response can be performed.

While the present embodiments of the invention have been described in substantial detail, it will be apparent that the invention may take many forms. Accordingly, it should be understood from the above description that various changes and modifications in the form and detail may be therein without departing from the spirit and scope of the invention.

What is claimed is:

1. An optical information recording and reproducing system for recording, reading and erasing data information by irradiation of light flux onto a data storing medium, comprising:

a light source for emitting a light flux;

a photo detector for detecting the power level of a first part of the light flux emitted from said light source and producing a corresponding monitor signal;

a light beam power compensation circuit for compensating for fluctuation of the power level of a second part of the light flux emitted from said light source in response to the detected monitor signal produced by said photo detector so as to maintain the power level of the light flux within a predetermined range;

light beam control means including at least one control loop circuit for controlling the tracking and focusing of the second light flux part emitted from said light source with respect to the data storing medium and directing the same to the data storing medium to carry out recording, reading or erasing of the data information; and inhibiting means operative while the second light flux part is being emitted from the light source and connected to the light beam control means for inhibiting effective irradiation of the second light flux part onto the data storing medium to thereby enable the light beam power compensation circuit to effect the compensation of the power level of the second light flux part during the inhibition of the effective irradiation of the second light flux part.

2. A system according to claim 1; wherein said light source comprises a laser diode for emitting the first light flux part in the form of a first light beam from a rear end thereof and emitting the second light flux part in the form of a second light beam from a front end thereof; and said photo detector comprises a p-i-n photo diode.

3. A system according to claim 1; wherein said light beam power compensation circuit includes a compensation control circuit for receiving the detected monitor signal and producing a compensation signal representative of the amount of fluctuation of the power level of the first light flux part, and a light source drive circuit for receiving the compensation signal from said compensation control circuit and controlling an emission drive current of the light source in response to the compensation signal.

4. A system according to claim 1; wherein said light beam control means includes another photo detector for receiving the light flux reflected from the data storing medium to detect a tracking and focusing error of the second light flux part, an optical system control circuit for receiving at least one servo error signal produced by said another photo detector, and an optical system drive circuit for receiving a correction signal from said optical system control circuit and producing a corresponding actuation drive signal to drive the system.

5. A system according to claim 4; wherein said optical system drive circuit comprises at least a power source for supplying an actuation drive current signal, switch means connected to said power source and activated by an inhibit signal produced by said light beam inhibit circuit, adder means connected to the power source through the switch means and said optical system control circuit for adding the actuation drive current signal and an output signal from said optical system control circuit upon activation of the switch means, a drive amplifier connected to the adder means for amplifying an output signal from the adder means to produce an actuation drive current, and an optical pickup including an objective lens for receiving the actuation drive current to effect defocusing of the second light flux part in response to the application of the inhibit signal.

6. A system according to claim 4; wherein said another photo detector comprises a dual-or quadruple-photo detector.

7. A system according to claim 1; including a controller for applying a command signal to said light beam power compensation circuit and said inhibiting means to initiate operation of the same.

8. A system according to claim 1; wherein said light beam control means includes at least an objective lens means for directing the second light flux part to the data storing means, an optical pickup for moving the objective lens means, and a voice coil motor for driving the optical pickup.

9. A system according to claim 1 including a controller for providing a write data signal representative of the data information to be written on the data storing means, a write gate signal for initiating the writing of the data information, and an adjust-in signal for automatically initiating the light beam power compensation circuit; and wherein the light beam power compensation circuit comprises a compensation control circuit for receiving the write data signal, the write gate signal, the adjust-in signal, and the detected monitor signal for producing a compensation signal to compensate the power level of the second light flux part used for writing the data information, and a light source drive circuit for receiving said write data signal, said adjust-in signal and said compensation signal and for controlling an emission drive current of the light source to keep the second light flux part within a predetermined range suitable for writing the data information in response to the compensation signal, write data signal and adjust-in signal.

10. A system according to claim 9 wherein said compensation control circuit comprises means for providing read and write reference signals, a comparator for receiving the read reference signal, the write reference signal and the detected monitor signal from said photo detector so as to compare the monitor signal with the write reference signal in response to the write data signal, a window comparator for receiving a compared output signal from said comparator to produce the compensation signal when the compared output signal is out of a predetermined range, a clock signal generator for producing a clock signal, at least one UP-DOWN counter for receiving said clock signal and the compensation signal from said window comparator and operative to reset the content thereof according to the compensation signal, and at least one D/A converter for receiving the output from said UP-DOWN counter to convert the same to a corresponding analogue signal.

11. A system according to claim 9; wherein said compensation control circuit includes a filter for filtering the write data signal and adjust-in signal.

12. A system according to claim 11; including a write reference power source for providing a write reference signal, and a multiplier connected to the filter and the write reference power source for multiplying the write reference signal to apply the multiplied write reference signal to the comparator.

13. A system according to claim 9; wherein said controller comprises a CPU including a temperature sensing device and a timer circuit.

14. A system according to claim 9; wherein said compensation control circuit comprises at least an adjusting circuit, a PID control circuit connected in parallel to said adjusting circuit, and a subtraction circuit for subtracting an output signal of said PID control circuit from an output signal of said adjusting circuit.

15. A system according to claim 1; wherein said light beam control means includes focus adjusting means for irradiating said second light flux part emitted from said light source onto the data storing medium in the form of a convergent beam; and said inhibiting means includes means cooperative with the focus adjusting means for inhibiting the effective irradiation of the second light flux part at least during recording or erasing data information by defocusing said second light flux part.

16. A system according to claim 1; wherein said inhibiting means includes means for inhibiting at least during recording or erasing data information the effective irradiation of the second light flux part onto the data storing medium by shifting said second light flux part out of the recording area of the data storing medium.

* * * * *